Oct. 29, 1963 T. B. HARPER 3,108,831
KNOTTER MECHANISM

Filed Nov. 12, 1959 6 Sheets-Sheet 1

INVENTOR.
TOBY B. HARPER
BY
Paul H. Johnson
ATTORNEY

Oct. 29, 1963  T. B. HARPER  3,108,831
KNOTTER MECHANISM
Filed Nov. 12, 1959  6 Sheets-Sheet 2

INVENTOR.
TOBY B. HARPER
BY
*Paul H. Johnson*
ATTORNEY

Oct. 29, 1963  T. B. HARPER  3,108,831
KNOTTER MECHANISM
Filed Nov. 12, 1959  6 Sheets-Sheet 3

INVENTOR.
TOBY B. HARPER
BY
*Paul H. Johnson*
ATTORNEY

*INVENTOR.*
TOBY B. HARPER
BY
ATTORNEY

United States Patent Office 3,108,831
Patented Oct. 29, 1963

3,108,831
KNOTTER MECHANISM
Toby B. Harper, Dolph, Ark.
Filed Nov. 12, 1959, Ser. No. 852,510
12 Claims. (Cl. 289—12)

This invention relates to a twine knotter, and more particularly, to a new and novel method and device for tieing knots in twine adaptable for use on hay balers.

A type of knotter most commonly used at the present time on hay balers incorporates a bill hook device which rotates during the tieing of the knot. The twine is grabbed by the bill hook which then rotates, twisting a knot into the twine and a wiper is actuated to wipe the knot from the grasp of the bill hook. Inherent in the characteristics of this common type of knotter is a certain degree of undependableness in that the present knotter mechanisms must be maintained in accurate adjustment if 100% tieing is to be expected. Due to the nature of hay baling equipment, wherein the equipment is subjected to much vibration in the gathering and packing of the hay, maintaining the present type of knotters in proper alignment is very difficult. This is a particularly onerous problem in that the hay baling equipment is operated by farmers who are not ordinarily expert mechanics.

The present type of knotting system, using the revolving bill hook, has an additional undesirable characteristic in that the twine in the area where the knot is formed is weakened. Some of the fibers making up the twine are broken by the pinching action of the bill hook. Often the twine, when subjected to the expanding force of the compressed bale of hay, is broken at a point which has been weakened during the formation of the knot.

The present invention contemplates a novel method of tieing knots in twine. Broadly stated, the invention may be defined as a twine knotter comprising a knot base member; a knot hook pivotably movable in relation to said knot base member; a threaded member adapted to loosely grasp said twine, said threader member disposed to rotate around said knotter base member in a plane substantially perpendicular to the longitudinal axis of said knot base member whereby to wrap said twine around said knot base member; means of actuating said knot hook to grasp said twine wherein said knot hook pulls a loop in said twine and means of expelling wrapped twine from around said knot base member and from grasp of said knot hook.

It is therefore an object of this invention to provide a method of tieing knots in twine which does not require that the knot base member and the knot hook be rotated during the tieing process.

Another object of this invention is to provide a method of tieing knots in twine wherein said twine is wrapped around the knot base member.

Another object of this invention is to provide a method of tieing a knot in twine wherein said method includes only positive steps precluding the likelihood of said knotter failing to tie a knot.

Another object of this invention is to provide a knotter mechanism wherein a threader member loosely grasps said twine and wraps it about a knot forming base member.

Another object of this invention is to provide a method of tieing twine wherein a knot wiper is not required.

Another object of this invention is to provide a device for tieing a knot in twine wherein said twine will be firmly held by said mechanism while the knot is being formed whereby twine forming said knot is not under stress during the tieing of the knot.

Another object of this invention is to provide a twine cutter which is stationary.

Another object of this invention is to provide a knotter mechanism which will be more simple to adjust whereby it may be easily maintained in proper operating alignment by non-experts.

Another object of this invention is to provide a knotter mechanism which does not depend upon speed of operation to function properly and which will therefore perform dependably at varying speeds of operation.

Another object of this invention is to provide a knotter mechanism which will be relatively more simple, less expensive, easier to manufacture and assemble, and more dependable than present knot tieing mechanisms.

These and other objects, and a better understanding of the invention may be had by referring to the following description and claims taken in conjunction with the attached drawings, in which:

Figure 1:
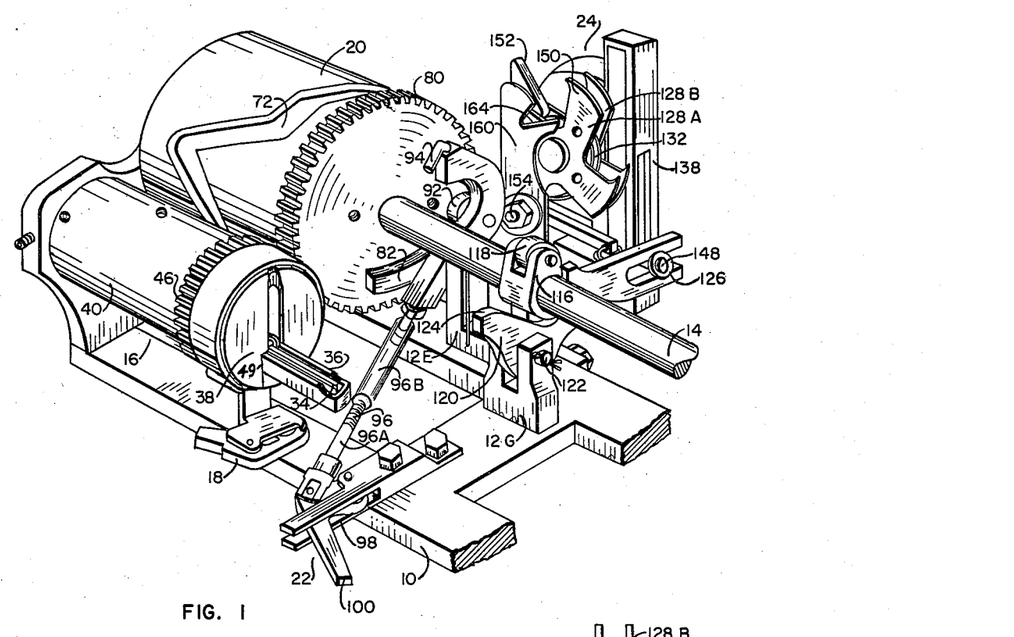
FIGURE 1 is a isometric view of the knot tieing mechanism of the invention.

Referring now to the drawings, and more particularly to FIGURE 1, the knot tieing portion of the invention is best disclosed. A common base, indicated by the numeral 10, supports the knot tieing portion, shown in FIGURE 1, and the shaft actuating section, shown in FIGURE 4. In actual practice the base 10 may not be a separate and distinct unit, but may constitute a part of the equipment to which the knot tier is affixed, as for instance the frame of a hay baler. This invention will be described as it particularly applies to tieing knots on a twine type hay baler, however, it is to be understood that the method and devices of the invention are equally adaptable to tieing twines and cords for any application and in association with any type of equipment. Affixed to base 10 are upright supports 12A of FIGURE 1, and 12B and 12C of FIGURE 4. An actuating shaft 14, common to the knot tieing portion of FIGURE 1 and the actuating portion of FIGURE 4, mechanically couples the two major portions of the invention together to provide means whereby rotary motion is supplied from the actuating portion of FIGURE 4 to the knot tieing portion of FIGURE 1.

The major elements of the invention are as follows: a knot base section indicated generally by numeral 16; a threader member indicated generally by numeral 18; a knot base cam indicated generally by numeral 20, a twine holder indicated generally by numeral 22; a twine binder and cutter indicated generally by numeral 24, all shown in FIGURE 1. A knot is tied in the twine by the rotation of shaft 14 through one revolution of 360°. The rotation of shaft 14 by the actuating mechanism of FIGURE 4 will be explained later.

Referring now to FIGURE 20 through FIGURE 24, the method whereby a knot is formed will be first described, to be followed by more particular descriptions of the details of function and construction of the individual elements of the invention.

*Method of Forming Knot*

Figure 20:
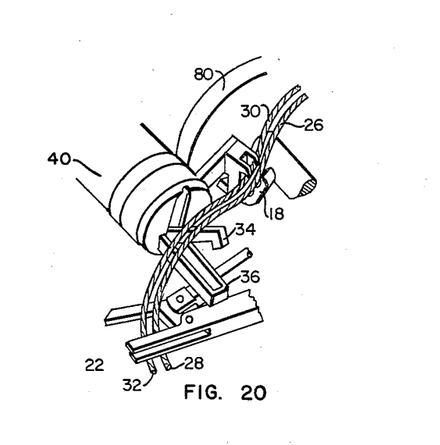
FIGURE 20 is a view of a portion of the knot tier portion of the invention, showing the twine as it is laid in the positions, has been cut by the cutter and is ready to be tied.

FIGURE 20 is a view of the major elements of the invention in a rest position. After sufficient hay has been compressed into the hay bale (not shown), a mechanism within the hay baler, not a part of this invention, trips a driving mechanism in the hay baler to rotate actuator shaft 14 one revolution in a manner to be described later.

After the hay has been fully bound by twine, (usually two separate twine lengths are used, placed at a lateral disposition perpendicular to the length of the hay baler) the hay baler expels the bound bale of hay. It can then be easily transported and stored in its compact, bound condition. When sufficient hay has been compacted within the hay baler to constitute a predetermined length of bale, a mechanism within the baler trips to start the formation of the knot. The end of twine 26, indicated by numeral 28, extends down into the hay baler and is looped around the bale of compressed hay being formed. When sufficient hay has been accumulated and the mechanism is tripped, a needle mechanism of the usual design (not shown in this disclosure) first brings the other end of the loop of twine 28 up around the end of the bale of hay nearest the point where the hay is being compressed and lays twine 30 into the knot forming position as is shown in FIGURE 20. The end of twine 30, indicated by numeral 32, extends then down into the hay baler and loops around the bale of hay so that twine extending from the end of 28 to end 32 forms a loop around the bale of hay. Thus FIGURE 20 indicates the position of the twine immediately after the hay baler needle has laid the twine into the tieing position. Also, FIGURE 20 shows the end of twine 26 and 30 having been cut by the holder cutter mechanism 24 (not shown in FIGURE 20) in a manner which will be described later. Therefore, FIGURE 20 shows the knotter mechanism in its rest position with both ends of twine 26 and 30 in position and having been cut ready for the formation of a knot which will hold the bale of hay in a compressed condition.

Figure 21:
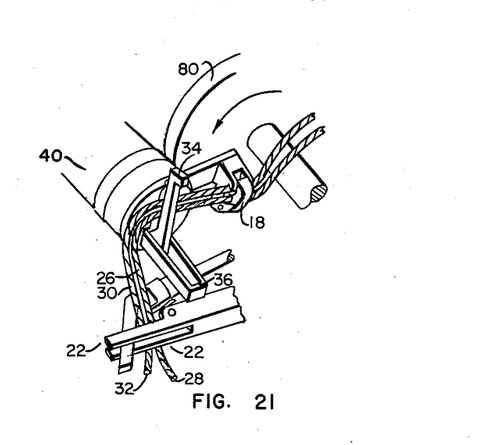
FIGURE 21 is in isometric view of the knotter mechanism during the first step in the tieing process.

FIGURE 21 shows the first step in the formation of a knot. Threader member 18 has closed, loosely grasping twine 26 and 30. Twine holder 22 has closed against twine 26 and 30 so that it will be held in a firm position and so that the action of the bale of hay contained within the loop at ends 28 and 32 cannot exert stress on twine 26 and 30 during the tieing process. It should be noted that knot hook 34, which is pivoted to knot base member 36, has been raised into a position substantially perpendicular to knot base member 36. This serves to hold twine 30 and 26 away from the knot base member 36 during the rest of the tieing process.

Figure 22:
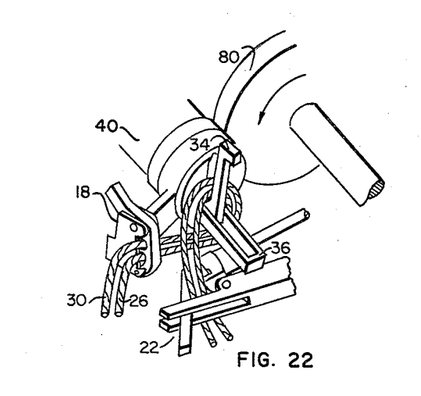
FIGURE 22 is an isometric view of the knotter mechanism in a further step in the tieing process.

FIGURE 22 indicates the continuation of the rotation of threader member 18 around knot base member 36 in the process of wrapping a loop of twine on the knot base member 36.

Figures 23, 25:
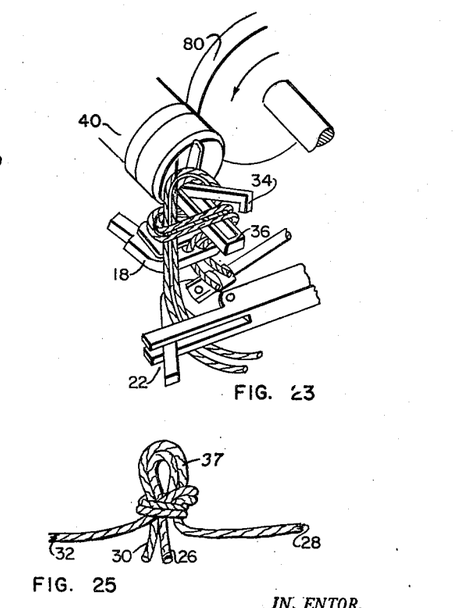
FIGURE 23 is an isometric view of the knotter mechanism in a still further step of the tieing process.
FIGURE 25 is a view of the knot formed by the method of this invention.

FIGURE 23 shows the threader 18 having completed in excess of 360° of revolution and having place a loop of twine about knot base member 36. At this point knot hook 34 is closing upon the loop of twine 30 and 26 which has been placed about knot base member 36.

Figure 24:
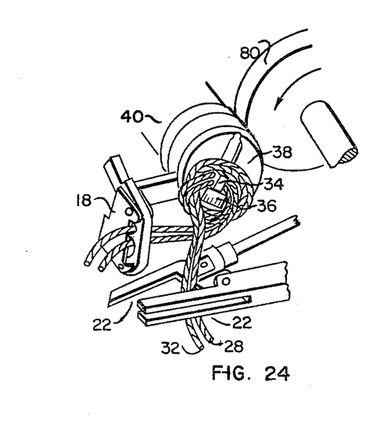
FIGURE 24 is an isometric view of the knot tieing mechanism showing the knotter in its final stage of the tieing process.

FIGURE 24 shows the final stage in the formation of a knot in twine 26 and 30. Knot hook 34 has closed completely against knot base member 36 and the knot base member 36 is being withdrawn into the knot base housing 40. As knot base member 36 is withdrawn into knot base housing 40 the knot base housing face 41 encounters the twine 26 and 30 which has been wrapped about knot base member 36 and, as knot base member 36 is withdrawn, pushes the twine which has been wrapped thereabout off the end of knot base member 36. The portion of the twine held within the grasp of the knot hook 34 is pulled within knot base housing 40, forming a loop 37 around which twine 26 and 30 is spiraled, which forms a type of bow knot. The knot as it appears after formation is shown in FIGURE 25. It will also be noted that twine holder 22 is loosening its grasp upon twine 26 and 30 whereby the hay baler will be free to pull the knot loop 37 from the grasp of the knot hook 34 constituting the final step in the formation of a knot.

By proper synchronization between the actuation of twine holder 22 and knot hook 34 it can be arranged whereby twine holder 22 does not release its grip on twine 26 and 30 until knot hook 34 has started returning to its rest position (as shown in FIGURE 20). In this manner the twine 26 and 30 forming the knot will be completely free of any stress exerted on the twine by the hay baler during the tieing process. This procedure assures a knot which will not have stress points and broken filaments caused by excessive pinching and stressing in the tying process.

The knot as formed of this invention is a type of bow knot wherein the center of the knot is a double thickness of twines 26 and 30. This double thickness in the core provides a knot having a resilient cushion center. This type knot has superior values to the type knots formed by hay baler knotters in present use. No areas of stress are established in the twine 26 and 30 where the knot is formed. This results in a fewer breakage of the filaments making up the typical hay baler twine so that a bale of hay having greater compressiveness and therefore greater weight, within a uniform size, may be formed without a danger of twine 26 and 30 breaking. Also, since twine holder 22 grasps the twine before the formation of the knot and holds it during the formation of the knot, the knot is formed in a more or less loose manner without stress being applied to it, and it is pulled tight by the compressive force of the bale of hay at it is released from the compression area of the hay baler.

Knot Base Section

Figures 8, 9, 12, 13:
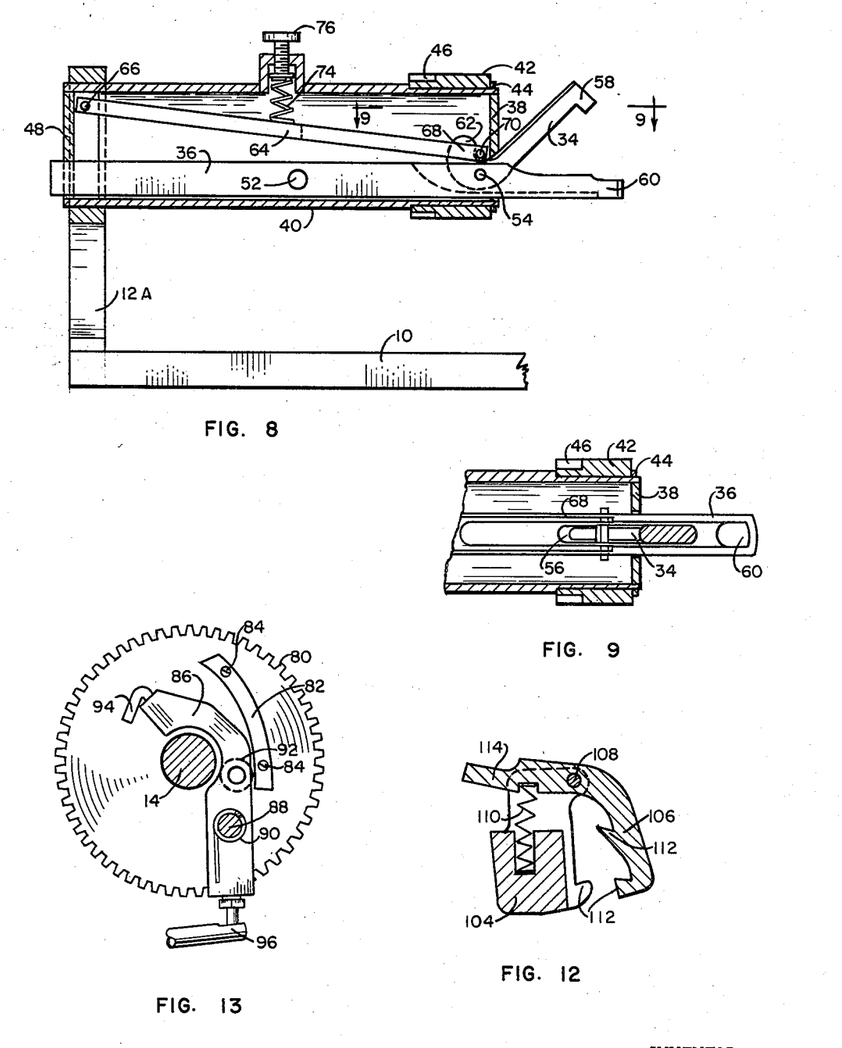
FIGURE 8 is a sectional view of the knot base housing taken along the line 8—8 of FIGURE 2.
FIGURE 9 is a cross-sectional view of a portion of the knot base housing taken along the line 9—9 of FIGURE 8.
FIGURE 12 is a cross-sectional view of the threader member taken along the line 12—12 of FIGURE 2.
FIGURE 13 is a cross-sectional view showing the holder actuator arm and holder actuator cam taken along the line 13—13 of FIGURE 2, with the cutting mechanism not shown.

Referring to FIGURE 8, the details of construction of the knot base section 16 and its accessory elements is best disclosed. The knot base housing 40 is supported to frame 10 by upright member 12A. The knot base housing 40 is shown in this invention as being of a cylindrical construction, however, construction of other geometric configurations would be equally adaptable. A threader collar 42 is rotatably positioned on one end of knot base housing 40 and is secured in position by a retaining ring 44. A threader gear 46, which may be affixed to threader collar 42, or formed integrally with it, is provided. Theader collar 42, by actuation of threader gear 46, is caused to rotate through two revolutions during the process of tying a knot. Threader 18 (not shown in FIGURE 8) is affixed to threader collar 22 to be rotated around knot base member 36 during the formation of a knot.

Figure 2:
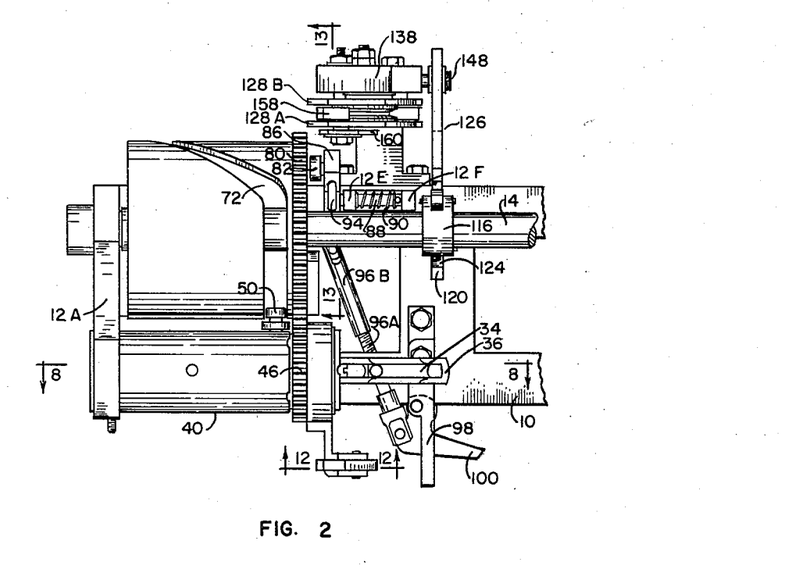
FIGURE 2 is a top view of the knot tieing mechanism of the invention.
Figure 3:
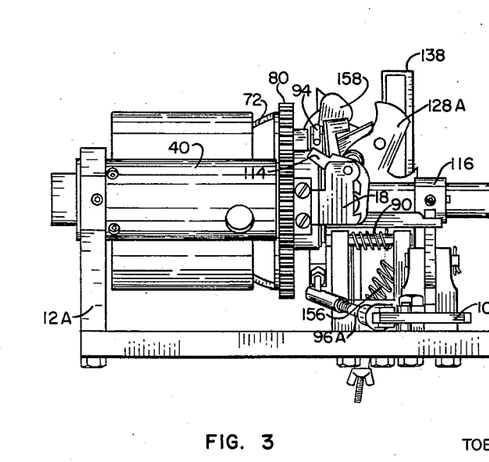
FIGURE 3 is an elevational view of the knot tieing mechanism of the invention.

Knot base member 36 is of a substantially rectangular cross-sectioned, elongated member, slideably positioned in knot base housing 40. The knot base housing face 41, in conjunction with knot base housing end member 48, supports knot base member 36 in a slideable position. An opening 49 in the knot base housing face 41 is provided to permit a portion of the knot base member 36 to slide in and out past the knot base member face 41 during the process of tying the knot. Knot base member 36 is actuated to slide through various positions during the formation of the knot by knot base cam 20 acting on a cam roller 50 (see FIGURE 2). Cam roller 50 is affixed to knot base member 36 by shaft 52. Knot base member 36 has an undercut groove 56. In groove 56 knot hook 34 is pivoted to knot base member 36 by a pivot shaft 54. Knot hook 34 has an integrally formed angular tip 58, disposed to engage and hold twine 26 and 30 to pull a loop 37 in the twine as knot base member 36 is withdrawn into knot base housing 40. A tip recess 60 is provided in the end of knot base member 36 to receive angular tip 58 of the knot hook 34. Tip recess 60 may be in the form of a hole drilled through knot base member 36, as is shown in the drawing of FIGURE 8.

Knot hook 34 has an integrally formed catcher portion 62 protruding substantially at a right angle to knot hook 34. A knot hook actuated arm 64 is pivoted at one end near the knot hook housing end member 48 by a pivot pin 66. The end of the knot hook actuating arm 64 nearest knot hook housing face 41 is split to form a forked end 68, receiving catcher portion 62 of knot hook 34. A pin 70 extends through forked end 68 of knot hook actuating arm 64 to operate against catcher portion 62 of knot hook 34. Forked end 68 with pin 70 rides upon knot hook 34 as knot base member 36 is withdrawn into the knot base housing 40.

Knot Base Cam

Figures 10, 11:
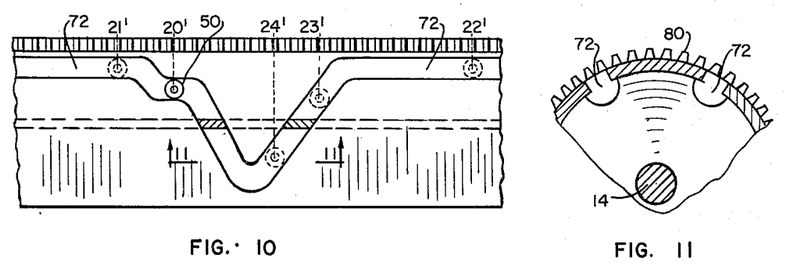
FIGURE 10 is a diagrammatic unrolled plan view of the knot base cam showing the position of the cam follower at various stages during the process of forming a knot.
FIGURE 11 is a cross-sectional view of a portion of the knot base cam.

The action of knot base cam 20 on cam roller 50 serves to move knot base member 36 back and forth at various positions within knot base housing 40 during the process of forming the knot, in a method such that knot hook 34 is actuated by the effect of knot hook actuating arm 64. FIGURE 8 is shown with the actuating arm 36 in a position of rest corresponding to the position when twine is laid in place preceding the formation of the knot, as indicated in FIGURE 20. FIGURE 10 is an unrolled plan view of knot base cam 20 with the cam mechanism 20 cut in two and laid out flat for purposes of demonstrating the position of cam roller 50 during various stages in the process of tying the knot. Cam 50 is shown in FIGURE 10 in a position of rest. When the knot tying cycle starts, knot base cam 20 rotates in the direction indicated by the arrow to force cam 50 in position indicated by the numeral 21', corresponding to FIGURE 21 of the drawings, being the approximate position at which cam 50 would be located at the point indicated by FIGURE 21. It will be noted that the movement between position 20' and 21' serves to extend knot base member 36 outwardly a slight amount from the rest position of FIGURE 8. When knot base member 36 is moved outwardly pin 70 of knot hook actuating arm 64 engages catcher portion 62 forcing catcher portion 62 downwardly and thereby raising knot hook 34 into a vertical, upright position as indicated in FIGURE 21. Cam 50 continues in cam groove 72, maintaining knot base member 36 in the extended position as shown in FIGURE 21 and FIGURE 22 while threader member 18 is winding twine 26 and 30 about the knot base member 36.

At the position indicated by numeral 23', cam groove 72 has moved cam 50 to begin retarding knot base member 36 back into the knot base housing 40. As knot base member 36 regresses into housing 40, pin 70 on knot hook actuator arm 64 releases the force on catcher portion 62, allowing knot hook 34 to start downward to a position parallel with knot base member 36. As knot base member 36 continues to regress into knot base housing 40, forked end 68 of knot hook actuating arm 64 engages the top of the knot hook 34 and presses it downward so that angle tip 58 is engaged with tip recess 60. This is indicated by FIGURE 24, and, as can be seen on FIGURE 10, position 24', cam 50 has been moved almost to its ultimate position of regression. Continuing the process of forming the knot following the positions shown in FIGURE 24, the knot base member 36 is moved to its maximum period of regression into knot base housing 40 whereby the twine 26 and 30 wrapped around the knot base member 40 is pushed off when it engages knot base housing face 41. As knot base cam 20 continues to rotate, the action of cam groove 72 will return cam 50 and thereby knot base member 36 to the rest position to await the actuation of the hay baler mechanism to form a new knot encompassing a new and different bale of hay.

A spring 74 is provided to maintain a resilient tension of knot hook actuating arm 64 against knot hook 34. A method is shown in FIGURE 8 (not shown in other views) whereby the amount of spring tension applied on knot hook actuating arm 64 may be varied. An adjusting screw 76 mounted in a projection 78 in knot base housing 40 permits the compressive force of spring 74 to be varied by rotating the adjusting screw 78 inwardly or outwardly. Except as is shown in FIGURE 8, the other views of the knot base housing 40 indicate spring 70 is positioned between the knot hook actuating arm 64 and the knot base housing 40 in a nonadjusting manner.

Knot base cam 20 is affixed directly to shaft 14 so that knot base cam 20 turns one revolution during the process of forming a knot. A cam gear 80 is directly affixed to or integrally formed with knot base cam 20 to turn with actuating shaft 14. Cam gear 80 engages threader gear 46 whereby threader gear 46, and consequently threader member 18, is turned two complete revolutions in the process of tying a knot.

Holder Actuator Cam

Affixed to the face of cam gear 80, and best shown in FIGURE 13, is a holder actuator cam 82 supported to the face of cam gear 80, as by screws 84. A cam rocker arm 86 is pivoted by rocker arm pintle 88 to base upright members 12E and 12F. A coiled spring 90 supported around rocker arm pintle 88 serves to resiliently hold cam rocker arm 86 in a direction away from actuator shaft 14 when cam rocker arm 86 is not influenced by holder actuator cam 82. Cam follower 92 affixed to cam rocker arm 86 engages holder actuator cam 82 during a portion of the rotation of shaft 14. The action of holder actuated cam 82 in moving cam rocker arm 86 towards actuator shaft 14 serves two functions. First, it moves a threader opening contact 94 to engage threader member 18 to open the threader member in a manner which will be described later, second, holder actuator cam 82, by connection through holder actuator rod 96, serves to open twine holder 22. Holder actuator rod 96 is pivotably affixed to the bottom portion of cam rocker arm 86.

Twine Holder

Referring to twine holder 22, as best shown in FIGURE 1, and FIGURES 20 through 24, it will be seen that twine holder 22 consists of a fixed jaw 104 mounted to base 10 and a pivotably mounted moveable jaw 106, mounted to pivot about pintle 108. Spring 90, through cam rocker arm 86 and holder actuator rod 96 serves to maintain holder moveable jaw 100 in a closed position at all times during the process of tying a knot, except when held open by holder actuator cam 82, which occurs only during the rest position of FIGURE 20 and again near the end of the process shown in FIGURE 24 wherein the holder 22 is opening to release the twine 30 and 26 after a knot has been formed. Holder actuator rod 96 is composed of a male portion 96A, and a female portion 96B whereby the length of the holder actuator rod 96 may be varied to adjust the width at which moveable jaw 106 will stand open in the rest position.

Threader Member

Threader member 18, as best shown in FIGURE 1, FIGURES 20 through 24, and in cross-section in FIGURE 12, acts to grasp the loose end of the twine 26 and 30 after it has been cut by twine binder 24, and wrap it about the knot base member 36. As is best shown in FIGURE 12, threader member 18 is composed of a fixed jaw portion 104 which is supported to threader collar 42. A moveable jaw 106 is pivoted to fixed jaw 104 by pintle 108. A spring 110 compressibly positioned between fixed jaw 104 and moveable jaw 106, serves to keep the jaws 104 and 106 in contact with each other when not otherwise held open. Fixed jaw 104 and moveable jaw 106 have integrally formed teeth elements 112 disposed to grasp the twine 26 and 30 during the knot tying process. Spring 110 is sufficiently compressive to retain twine 26 and 30 within the grasp of jaws 104 and 106, but does not place sufficient force on the twine to prevent it from sliding through the jaws 104 and 106 as it is being wrapped around knot base member 36. Moveable jaw 106 has an extended shank portion 114 substantially perpendicular to the main jaw portion which is disposed to engage threader opening contact 94 of cam rocker arm 86. When the device is in the rest position as indicated in FIGURE 20, threader opening contact 94 is moved into position by cam 82 so that it engages shank portion 114 of moveable jaw 106 to open the moveable jaw 106 and place it in position to receive twine 26 and 30 for the next knot.

Twine Binder

In the knot tying process of a typical hay baler a needle member (not shown) brings a twine up to be tied around a bale of hay. The knot is formed while the needle is in the upward position. After the formation of the knot the needle reverts back to its normal position allowing baled hay to pass over it accumulating a sufficient amount to form a new bale. When the needle arm reverts back to its normal position a twine is carried from the twine binder 24 and is positioned in the opened threader member 18 and along the anterior of knotter hook 34 and in the opened position of twine holder 22. It is therefore necessary for the twine binder 24 to cut both twines 26 and 30 at the initiation of the tying cycle and at the same time to hold the end of twine 28 which will be lowered to form around the next bale of hay.

The twine binder 24 is actuated by binder cam 116 affixed to shaft 14. Binder cam 116 rotatably supports a cam roller 118. A cam lever 120 is pivotably supported to base 10 by upright member 12G. Upright member 12G is forked and pivotably supports cam lever 120 with a pin 122. Cam lever 120 has an integrally formed cam surface 124 disposed to be engaged by cam roller 118 on each revolution of actuating shaft 14. The other end of cam lever 120 is a forked lever portion 126 which is actuated upon rotation of shaft 114 to move quickly up when cam roller 118 engages the initial portion of cam surface 124, and then to move immediately back down into rest position. When the tying cycle starts actuating shaft 14 is rotated a few degrees. Concurrently with the actuation of holder actuator cam 82 to cause threader moveable jaws 106 to close, cam roller 118 engages cam surfaces 124 moving forked lever portion 126 of cam lever 120 quickly in an upward position.

Figure 15:
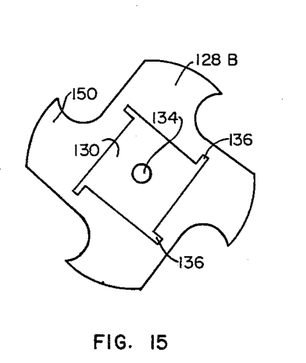
FIGURE 15 is an elevational view of the holder plates.
Figure 16:
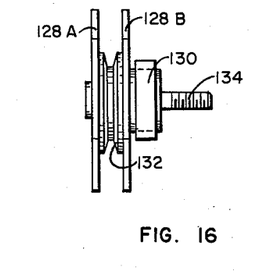
FIGURE 16 is a top view of the holder plates.

The cutting of the twine 26 and 30 and the holding of the end retained by the hay baler needle mechanism is accomplished by revolving of a pair of holder plates 128A and 128B through a rotation of 90°. The configuration of holder plates 128A and 128B is best shown in FIGURE 1, FIGURE 15 and FIGURE 16. As shown in FIGURE 15, holder plate 128B has affixed a four position ratchet 130. Separating holder plates 128A and 128B, best shown in FIGURE 16, is a holder disc 132. Holder plates 128A and 128B, four position ratchet 130 and holder disc 132 are assembled together in an immovable relationship with each other on a bolt 134, and are rotatably supported by bolt 134. The four position ratchet 130 has four teeth 136, positioned in a 90° relationship to each other.

Figure 14:
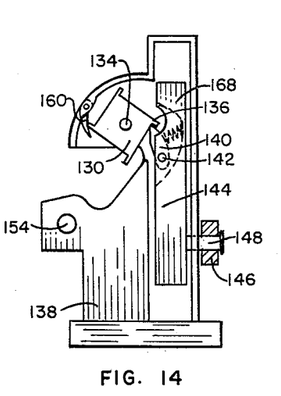
FIGURE 14 is an elevational view of the holder and cutter support member.

Referring now to FIGURE 14, a holder support member 138 is shown with four position ratchet 130 shown in place but with the holder plates 128A and 128B removed. The four position ratchet 130 is actuated by a pawl 140 pivotably supported by pin 142 onto a pawl support guide 144. Pawl support guide 144 is actuated in a vertical direction by the fork lever portion 126 of cam lever 120. A roller 146 affixed to pawl support guide 144 by roller pin 148 engages fork lever portion 126 to move the pawl support guide 144 up and down as actuated by binder cam 116. When binder cam 116 is rotated by actuator shaft 14 to engage cam surface 124 pawl support guide 144 is moved in an upward position whereby pawl 140 engages a tooth 136 of four position ratchet 130 to move cam holder plates 128A and 128B through a rotation of 90°.

Figure 17:
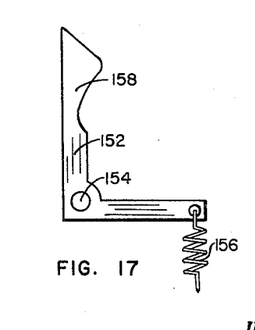
FIGURE 17 is a side view of the holder bar and its associated spring.
Figure 18:
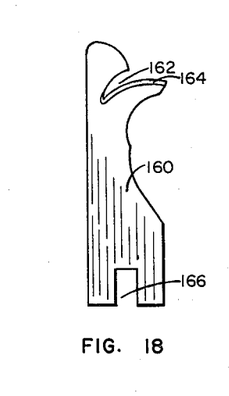
FIGURE 18 is a side view of the twine cutter.
Figure 19:
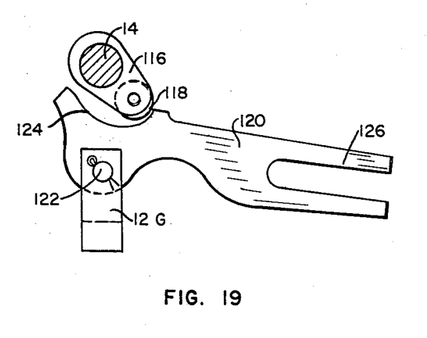
FIGURE 19 is a side view of the holder cam and cam lever.

Holder plates 128 are formed with extending wing portions 150 which engage twine 26 and 30 to perform two functions. First, the wing portions 150 pulls the twine 26 and 30 into a compressive contact between holder disk 132, positioned between holder plates 128A and 128B, and compresses the twine between this holder disk 132 and a holder bar 152 (see FIGURE 17). Holder bar 152 has a right angle configuration pivotably supported by bolt 154. A spring 156 having one end affixed to one arm of holder arm 152 and the other end affixed to base 10, resiliently forces the contact portion 158 of holder bar 152 to engage holder disk 132. Twine is forced by wing portions 150 into resilient engagement between contact portion 158 of holder bar 152 and holder disk 132. This resilient engagement serves to bind the twine attached to the hay baler needle so that withdrawal of the needle will leave a twine 26 in position for the next bale of hay and the next knot. The second effect of the movement of holder plates 128A and 128B through a 90° rotation is the cutting of the twine 26 and 30 to permit threader assembly 18 to wind the cut portion around the knot base member 36 to form a knot. A cutter member 160 is positioned to be supported adjacent the holder plates 128A and is supported by bolt 154. Cutter member 160 has a cutting notch 162 formed therein to receive the twine 26 and 30 as it is moved into cutter member 160 by the movement of holder plates 128A and 128B. A cutting edge 164 is provided along the lower surface of cutting notch 162 so that the movement of twine 26 and 30 by holder plates 128A and 128B along the cutting edge 164 of cutter member 160 serves to slice the twine in two. It should be noted that the cutter member 160 of this invention is stationary and is easily removable by loosening bolt 154, which engages a slot 166 in the cutter member 160. After bolt 154 is loosened cutter member 160 may be easily slid out and a new replacement cutter member 160 inserted in its place to facilitate easy replacement of this element and to make possible its easy removal for re-sharpening. The stationary cutter member 160 is positive in its cutting action and does not require a particular degree of speed in the actuation of the knotter mechanism to perform its cutting duty as is the case of the moving type cutter mechanism in present use.

A backup pawl 166 is pivotably supported to holder support 138 to engage ratchet teeth 136 and prevent four position ratchet 130 from accidentally being rotated in a backward direction, as by vibration of the hay baler, when the knotter mechanism is in rest position. A small spring (not shown) supports backup pawl 166 against four position ratchet 130. Pawl support guide 144 is provided with an upper portion 168 which also serves to prevent four position ratchet 130 from accidentally moving beyond the position at which it is left after rotation by pawl 140. FIGURE 14 shows the pawl support guide in an upward position occurring at approximately one-half of the upward movement of the forked lever portion 126 of cam lever 120. After pawl support guide has completed its further most upward position and has returned to normal position, the upper portion 168 of the pawl guide 144 will come to rest against four position ratchet 130 to prevent the rotation of the ratchet in a forward direction. Thus by the combined action of upper portion 168 of pawl support guide 144 and the backup pawl 166, the four position ratchet 130 will at all times be supported correctly so that it cannot accidentally be rotated in either direction when the mechanism is in rest position.

*Shaft Actuating Mechanism*

Figure 4:
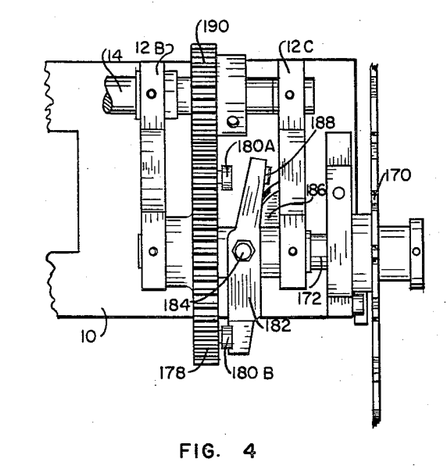
FIGURE 4 is a plane view of the shaft actuating mechanism of the invention.
Figure 5:
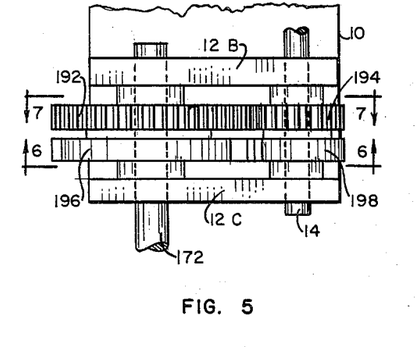
FIGURE 5 is a plane view of an alternate shaft actuating mechanism of the invention.

The knot tying portion of the invention, as shown isometrically in FIGURE 4, is actuated from shaft 14 which is in turn actuated by the actuating mechanism of FIGURE 4 or FIGURE 5. In the operation of a hay baler, when sufficient quantity has been accumulated in the compressed position to constitute one bale, a mechanism within the baler trips a gear to rotate one revolution. This one revolution suffices to perform the tying of the knots necessary to hold the bale in the compressed condition. This one revolution is supplied, referring to FIGURE 4, to input sprocket 170. The one revolution of power supplied by the hay baler to perform the tying of a knot requires that the needle carrying the string be raised into tying position, the knot tied and the needle returned to rest position. In this step approximately one-fourth of the revolution supplied by the hay baler for the tying operations is taken up in the raising of the hay baler needle, and one-fourth is taken up in the lowering of the hay baler needles, leaving approximately one-half of a revolution in which to tie a knot. The mechanism of FIGURE 4 and FIGURE 5 are means whereby one-half of the revolution of energy supplied by the hay baler is used to turn actuating shaft 14 through 360° to accomplish the tying of a knot. In FIGURE 4, input sprocket 170 is connected to a shaft 172. A gear 178 is rotatably mounted on shaft 172. Two contact pins 180A and 180B are affixed to gear 178. A pivotably positioned sprocket 182 is affixed to shaft 172 by bolt 184. A cam section 186 is affixed to upright member 120C. A cam roller 188 is pivotably supported to one end of sprocket 182. As shaft 172 is rotated by input sprocket 170, from rotary energy supplied by the hay baler, sprocket 182 engages, after a one-quarter revolution of shaft 172, a contact point 180A. By force transmitted through shaft 172, through sprocket 182 to contact points 180A, gear 178 will be rotated 180°. Shaft gear 190, which is one-half the circumference of gear 178, is affixed to actuating shaft 14 and engages gear 178. Thus as gear 178 is rotated through 180°, shaft gear 190, and therefore shaft 14, will be rotated, through 360° to form a knot. After sprocket 182 has rotated gear 178 approximately 180°, cam roller 188 engages cam section 186 to pivot sprocket 182 whereby it is disengaged with contact point 180A. Input sprocket 170 will continue to rotate through 90 more degrees, terminating its 360° of rotation without further rotating actuating shaft 14. On the next cycle input sprocket 170 will rotate approximately 90° and sprocket 182 will engage contact point 180B to rotate gear 178 through 180° and then will be released by engagement of cam roller 188 with cam section 186. By the repetition of this process, it can be seen that input sprocket 170 rotates through 360° while actuating shaft 14 rotates through 360°, but actuating shaft 14 is revolved in one-half of the time taken for the complete revolution of sprocket shaft 170.

Figure 7:
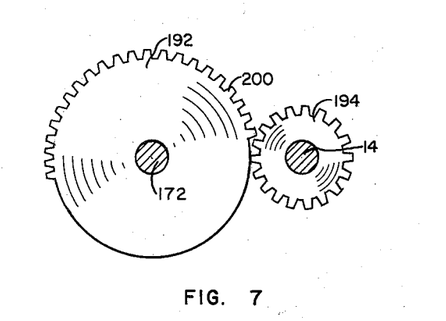
FIGURE 7 is a sectional view of a portion of the alternate shaft actuating mechanism taken along the line 7—7 of FIGURE 5.

The mechanism of FIGURE 5 accomplishes the same function as that of FIGURE 4. A gear 192, shown in FIGURE 7, having teeth through only 180° of its circumference, is affixed to input shaft 172. (Input sprocket 170 is not shown in FIGURE 5.) Gear 192 engages actuating shaft gear 194. Also affixed to input shaft 172 is a cam 196 and a smaller cam 198 is affixed to actuating shaft 14. Gear 192 turns in unison with cam 196 and actuator shaft gear 194 turns in unison with cam 198. When shaft 170 is turned it rotates approximately 90° before the teeth 200 of gear 192 engages actuator shaft gear 194. At the same time a tooth 202 on cam 196 engages a slot 204 in cam 198. Gear 192 is of twice the circumference of shaft gear 190 so that the action of teeth 200 on gear 192 against actuator shaft gear 194 causes shaft 14 to rotate through 360° while shaft 170 is rotating through 180°. The function of tooth 202 intersecting slot 204 serves to absorb the shock of starting the rotation of the knotter mechanism so that the first tooth on the gear 192 will not absorb the complete shock and be quickly worn away.

Figure 6:
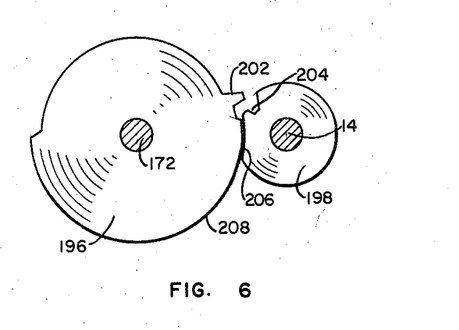
FIGURE 6 is a sectional view of a portion of the alternate shaft actuating mechanism taken along the line 6—6 of FIGURE 5.

Also, and of most importance, cam 198 has a recessed surface portion 206 and cam 196 has a raised surface portion 208. During the 180° of the rotation of shaft 172 wherein shaft 14 is stationary the raised portion of cam 196 engages the recessed portion of cam 198 which serves to prevent shaft 114 from inadvertently turning during the rest position of the mechanism. In many cases, a hay baler may be pulled for a considerable distance before sufficient hay is accumulated to constitute a bale and therefore the knotter mechanism may be required to be retained in the rest position for a considerable length of time and during that time to be subjected to a great amount of vibration. In order for the tying mechanism to work, it must be in rest position when the twine is delivered by the baler needle. By the cam provision of FIGURE 6, actuating shaft 14 cannot be jolted out of its correct rest position.

Although this invention has been described with a certain degree of particularity it is manifest that many changes may be made without departing from the spirit and scope of the disclosure. This invention contemplates a new method of tying knots, particularly adapted to the baling of hay. It is obvious that the methods of this invention may be practiced by a variety of mechanisms.

Therefore it is understood that the mechanism disclosed are by way of example only, and that the inventor does not intend to limit his novel knot tying method to the specific embodiments of the mechanisms set forth herein.

I claim:

1. A device for tieing a knot in twine comprising, in combination, a knot base housing, said knot base housing having an axial opening therein; a knot base member slideably positioned in said axial opening of said knot base housing; a knot hook pivotably affixed to said knot base member, said knot hook having an integrally formed substantially perpendicular catcher portion; a knot hook actuating arm having one end pivotably affixed to said knot base housing and one end disposed to engage said knot hook to constrain said knot hook to pivot towards said knot base member when said knot base member is positioned toward said pivotal mounting of said knot hook actuating arm and to engage said catcher portion of said knot hook when said knot base member is positioned away from said pivotal mounting of said knot hook actuating arm whereby said knot hook is pivoted perpendicularly to said knot base member; spring means resiliently constraining said knot hook actuating arm in contact with said knot hook; a threader means disposed to wrap said twine about said knot base member; means to actuate knot base member whereby said knot hook is constrained to grasp said twine wrapped about said knot base member; and means of expelling said twine from about said knot base member whereby a loop is pulled in said twine by said knot hook to form a knot in said twine.

2. A device according to claim 1 wherein said threader member comprises a threader body member adaptable for rotation around said knot base member; a threader jaw pivotably mounted on said threader body member; said threader jaw having integrally formed teeth adapted to engage said twine; spring means adaptable to resiliently secure said threader jaw in contact with said threader body member to engage said twine therebetween; and means of pivoting said threader jaw away from said threader body member to receive said twine.

3. A device according to claim 1 wherein said means of actuating said knot base member includes cam means.

4. A device according to claim 1 including spring means disposed between said knotter base housing and said knot hook actuating arm whereby said knot hook actuating arm resiliently engages said knot hook.

5. A device according to claim 4 wherein said spring means includes adjustable spring means.

6. A device for knotting twine comprising, in combination, a knot base housing having an opening therein, said knot base housing having a face substantially perpendicular to longitudinal axis of said opening; a knot base member slideably positioned in said opening of said knot base housing; a knot hook pivotably positioned in relation to said knot base member; a threader member disposed to grasp said twine and to rotate around said knot base member in a plane substantially perpendicular to longitudinal axis of said knot base member whereby said twine is wrapped at least once around said knot base member; means of actuating said knot hook to grasp said twine wrapped around said knot base member; means of slideably retracting said knot base member into said knot base housing whereby said twine wrapped around said knot base member engages said perpendicular face of said knot base housing and whereby said twine wrapped around said knot base member is expelled from said knot base member by said face of said knot base member and whereby said knot hook pulls a loop in said twine whereby a knot is formed in said twine.

7. A device according to claim 6 wherein said means of slideably retracting said knot base member into said knot base housing includes cam means.

8. A device for knotting twine comprising, in combination, a base; an actuating shaft rotatably supported to said base and disposed to receive rotational energy for knotting said twine; a cylindrical cam member affixed to said actuating shaft whereby said axis of said actuating shaft is coincident with axis of said cam member, said cam member having a cam groove therein; a cam gear affixed to said actuating shaft whereby axis of said cam gear and said actuating shaft are coincident; a knot base housing affixed to said base, said knot base housing having a face substantially perpendicular to said base, said face of said knot base housing having an opening therein; a knot base member disposed to be received by said opening in said face of said knot base housing; a threader collar rotatably mounted on said knot base housing whereby said threader collar is disposed to be rotated in a plane substantially perpendicular to said knot base member; a threader gear integrally formed with said threader collar, said threader gear disposed to engage said cam gear to be rotated by rotation of said cam gear; a threader member affixed to said threader collar to be rotated about said knot base member; a knot hook pivotably affixed to said knot base member; a cam follower affixed to said knot base member disposed to engage said cam groove of said cam member whereby said knot base member is slideably actuated by rotation of said cam member; means of actuating said threader member to grasp said twine whereby as said threader member is rotated said twine is wrapped at least once around said knot base member; means of actuating said knot hook whereby said knot hook is pivoted against said knot base member as said knot base member is withdrawn by said cam member into said opening in said face of said knot base member whereby said twine wrapped around said knot base member engages said face portion of said knot base housing and whereby said twine is expelled from around said knot base member and said knot hook pulls a loop in said twine whereby a knot is formed in said twine.

9. A device according to claim 8 wherein said threader member includes a fixed jaw portion, said fixed jaw portion affixed to said threader collar; a moveable jaw portion pivotably mounted on said fixed jaw portions, said fixed jaw portion and said moveable jaw portions having integrally formed teeth disposed to grasp said twine, and wherein said moveable jaw portion has an extended shank portion; and contact means disposed to engage said extended shank portion at a predetermined position in the rotation of said threader member whereby said moveable jaw portion is pivoted away from said fixed jaw portion to receive said twine.

10. A device according to claim 8 including a twine holder disposed to hold said twine at a point intermediate portion of said twine to be knotted and major portion of said twine, said twine holder consisting of a fixed jaw; a moveable jaw pivoted to said fixed jaw; and means of actuating said moveable jaw to close upon said fixed jaw to hold said twine therebetween.

11. A device according to claim 10 wherein said means of actuating said moveable jaw comprises a cam rocker arm pivotably affixed to said base; a holder actuator cam actuated by rotation of said actuator shaft; a cam follower affixed to said cam rocker arm disposed to engage said holder actuator cam and to pivot said rocker arm when said cam follower engages said holder actuator cam; a holder actuator rod having one end pivotably affixed to said cam rocker arm and one end pivotably affixed to said moveable jaw of said twine holder whereby engagement of said cam follower with said holder actuator cam pivots said cam rocker arm to actuate said holder actuator rod and pivot said moveable jaw of said twine holder away from said fixed jaw.

12. In a device to knot twine wherein said twine is wrapped about a knot base member by a threader member disposed to rotate about said knot base member and wherein said threader member has a moveable jaw pivotably to open to receive said twine and wherein said moveable jaw has an extended shank portion, means of actuating said moveable jaw portion to open said moveable jaw portion to receive said twine comprising a pivotably supported cam rocker arm; a cam follower affixed to said cam rocker arm; a cam actuated in synchronization with rotation of said threader disposed to engage said cam follower and to pivot said cam rocker arm in the direction of the arc of rotation of said threader member; and a threader opening contact affixed to said cam rocker arm disposed to contact said extended shank portion of said moveable jaw portion to pivot said moveable jaw portion in an open position to receive said twine.

References Cited in the file of this patent

UNITED STATES PATENTS

| | | |
|---|---|---|
| 846,458 | Donovan | Mar. 12, 1907 |
| 1,099,128 | Poege | June 2, 1914 |
| 1,205,772 | Muhfelder | Nov. 21, 1916 |
| 1,272,711 | Raney et al. | July 16, 1918 |
| 2,454,689 | Dashew | Nov. 23, 1948 |
| 2,506,445 | Donning | May 2, 1950 |
| 2,702,718 | Shortland | Feb. 22, 1955 |
| 2,815,233 | Collins | Dec. 3, 1957 |
| 2,879,095 | Altenweger | Mar. 24, 1959 |
| 2,905,002 | Cupak | Sept. 22, 1959 |
| 2,913,270 | Sachenroder et al. | Nov. 17, 1959 |

FOREIGN PATENTS

| | | |
|---|---|---|
| 688,414 | Great Britain | Mar. 4, 1953 |